US007797507B2

(12) United States Patent
Tago

(10) Patent No.: US 7,797,507 B2
(45) Date of Patent: Sep. 14, 2010

(54) VIRTUAL MACHINE SYSTEM AND OPERATING METHOD THEREOF

(75) Inventor: Akira Tago, Tokyo (JP)

(73) Assignee: NEC Corporation, Tokyo (JP)

(*) Notice: Subject to any disclaimer, the term of this patent is extended or adjusted under 35 U.S.C. 154(b) by 511 days.

(21) Appl. No.: 11/878,576

(22) Filed: Jul. 25, 2007

(65) Prior Publication Data

US 2008/0028124 A1    Jan. 31, 2008

(30) Foreign Application Priority Data

Jul. 26, 2006   (JP) .............................. 2006-202870

(51) Int. Cl.
G06F 12/00 (2006.01)
G06F 13/00 (2006.01)
G06F 13/28 (2006.01)
G06F 21/00 (2006.01)
G06F 9/26 (2006.01)
G06F 9/34 (2006.01)
G06F 9/46 (2006.01)
G06F 15/177 (2006.01)
G06F 1/24 (2006.01)

(52) U.S. Cl. .......................... 711/203; 711/6; 711/147; 711/202; 713/2; 718/100

(58) Field of Classification Search ................ 711/6
See application file for complete search history.

(56) References Cited

U.S. PATENT DOCUMENTS 6,789,156 B1 * 9/2004 Waldspurger ................. 711/6

7,500,048 B1 * 3/2009 Venkitachalam et al. ....... 711/6
2004/0064813 A1 * 4/2004 Neiger et al. ................. 718/1
2004/0205755 A1 * 10/2004 Lescouet et al. ............ 718/100
2007/0074208 A1 * 3/2007 Ling et al. ................... 718/1
2007/0136721 A1 * 6/2007 Dunshea et al. ............ 717/174

FOREIGN PATENT DOCUMENTS

| JP | 62-8234 | 1/1987 |
|---|---|---|
| JP | 9-319643 | 12/1997 |
| JP | 11-306147 | 11/1999 |
| JP | 2001-256066 | 9/2001 |
| JP | 2002-157133 | 5/2002 |
| JP | 2004-258698 | 9/2004 |
| JP | 2006-48506 | 2/2006 |

OTHER PUBLICATIONS

Robert L. Mitchell, "How to manage virtual machines/servers", Computer World, IDG Japan, Jul. 20, 2006, vol. 3, No. 9, pp. 85-91 (CS-ND-2006-01416-002).
Japanese Office Action dated Jul. 3, 2008 with partial English-Language Translation.

* cited by examiner

*Primary Examiner*—Christian P Chace
*Assistant Examiner*—Ryan Bertram
(74) *Attorney, Agent, or Firm*—McGinn IP Law Group, PLLC

(57) ABSTRACT

A virtual machine system includes a physical memory and a virtual machine monitor (VMM). When a kernel image of one guest OS, in startup of the one guest OS, has already been loaded on the physical memory, the VMM starts up one guest OS with the kernel image.

10 Claims, 15 Drawing Sheets

FIG. 5

701 MANAGEMENT TABLE

| ID | ADDRESS | SIZE | REFERENCE COUNTER CNT |
|---|---|---|---|
| OS101 | ADD1 | SIZE 1 | 1 |
|  |  |  |  |
| ⋮ | ⋮ | ⋮ | ⋮ |

FIG. 6

702 MAPPING TABLE

| ID | VM PHYSICAL ADDRESS | REAL PHYSICAL ADDRESS |
|---|---|---|
| OS101 | XXX | ADD1 |
|  |  |  |
|  |  |  |
| ⋮ | ⋮ | ⋮ |

VIRTUAL MACHINE SYSTEM AND OPERATING METHOD THEREOF

BACKGROUND OF THE INVENTION

The present invention relates to a virtual machine system and an operating method thereof, and more particularly to a technique for management of resources in virtual machine environments.

In recent years, virtualization techniques for computing machines have attracted increasing attention. By the virtualization technique, it is possible to construct plural virtual computing machines on one real computing machine, and to run plural Operating Systems (OSs) independently. While the real computing machine is termed as "Real Machine", this virtual computing machine is referred to as "Virtual Machine (VM)". The VM is constructed based on and controlled by a Virtual Machine Monitor (VMM), which is a software running on the real machine. While an Operating System (OS) running on the real machine is referred to a "host OS", an OS running on the VM provided by the VMM is referred to as a "guest OS".

Plural VMs are constructed assuming that these machines run independently on the same real machine. Since the plural VMs are completely separated from each other, it is basically necessary to prepare for a memory source for each VM.

FIG. 1 schematically shows the allocation of memory resources in a VM environment of the related art. Two VMs (VM1, VM2) run on the same real machine. The VMM performs mapping between a physical address space of a virtual memory owned by the VM and a real physical address space of a physical memory owned by the real machine using a mapping table. For example, a top address "xxx" of a kernel text section in a VM1 physical address space is mapped to an address "ADD1" in a real physical address space. In contrast, a top address "yyy" of a kernel text section in a VM2 physical address space is mapped to an address "ADD2" in the real physical address space.

In this way, the kernel text section of the VM1 and the kernel text section of the VM2 are allocated to separate areas in the real physical address space. When the guest OS running on the VM1 is the same as the guest OS running on the VM2, that is, when the VM1 and the VM2 have the same kernel text section, memory images of the kernel text section are superimposed on each other on the physical memory. In other words, when the same kernel text is loaded into plural VMs, the memory resources are not used effectively.

For this reason, a method has been proposed in which the same memory image on the physical memory is shared between the plural VMs. FIG. 2 schematically shows sharing of the memory image. In the case of an example shown in FIG. 2, an address "yyy" in the VM2 physical address space in a mapping table associated with the VM2 corresponds to an address "ADD1" in the real physical address space. As a result, when the VM2 refers to the kernel text section, the VMM accesses an area starting from the address "ADD1" of the real physical address space. That is, the kernel text section on the physical memory is shared between the VM1 and the VM2. This saves the memory resources.

A method for sharing the memory image between the VMs is known as follows. For example, plural templates for OS kernels and application programs are previously prepared for in the VMM. A user selects which template is started/executed. When the same template is used on the VMs, the memory image is shared between the VMs.

According to the technique as disclosed in patent document 1 (Japanese Unexamined Patent Document 2004-258698), sharing of the memory image is performed after the entire completion of boot of plural OSs, which includes loading of the kernel.

That is, at the timing of the operation of the plural OSs, the sharing of memory sources is performed. Thus, a dedicated application (an application of requirement for memory sharing) is prepared, and executed by each of the OSs. The dedicated application on the first OS previously registers a memory area by an entry. The user designates the entry and the second OS, and instructs the dedicated application on the second OS to perform the sharing. The dedicated application on the second OS checks whether the memory image in the designated memory area can be shared or not according to the instruction of the user. In this way, it is necessary for the user to prepare for the dedicated applications and to designate the OS and the object to be shared. Patent Document 1 does not describe the process in shutting down the OS.

According to the related technique as described above, the user is required to previously prepare for the template in the VMM or to designate the OS and object to be shared. However because in recent years viruses have increased along with the popularization of the Internet, the frequency of updating of an OS/application program has been increased. And as an OS remote install or a SAN (Storage Area Network) boot becomes popular, systems including various kinds or versions of OSs have been available. In such an environment, the intervention of the user is required for sharing of the memory image between the VMs, which may increase burden on the user or a system constructor and manager.

SUMMARY OF THE INVENTION

An object of the present invention is to provide a virtual machine system which automatically checks whether a kernel image can be shared or not in startup of a guest OS, and an operating method thereof.

According to one aspect of the present invention, a virtual machine is provided which includes a physical memory and a virtual machine monitor (VMM) and when a kernel image of one guest OS, in startup of the one guest OS, has already been loaded on the physical memory, the VMM starts up one guest OS with the kernel image.

According to one aspect of the present invention, an operating method of a virtual machine system, wherein the virtual machine system includes a virtual machine monitor (VMM), the method comprising the step of: when a kernel image of one guest OS, in startup of the guest OS, has already been loaded on a physical memory, starting up one guest OS with the kernel image.

According to one aspect of the present invention, a computer readable medium recording thereon a program for enabling a computer providing a virtual machine environment to execute the step of: when a kernel image of one guest OS, in startup of the guest OS, has already been loaded on a physical memory, starting up one guest OS with the kernel image.

BRIEF DESCRIPTION OF THE DRAWINGS

Other features and advantages of the invention will be made more apparent by the following detailed description and the accompanying drawings, wherein:

FIG. 5 is a schematic diagram showing a management table;

FIG. 6 is a schematic diagram showing a mapping table;

In the drawings, the same reference numerals represent the same structural elements.

DETAILED DESCRIPTION OF THE PREFERRED EMBODIMENTS

A first exemplary embodiment of the present invention will be described in detail below.

1. Structure 1-1. Entire Structure

Figure 1:
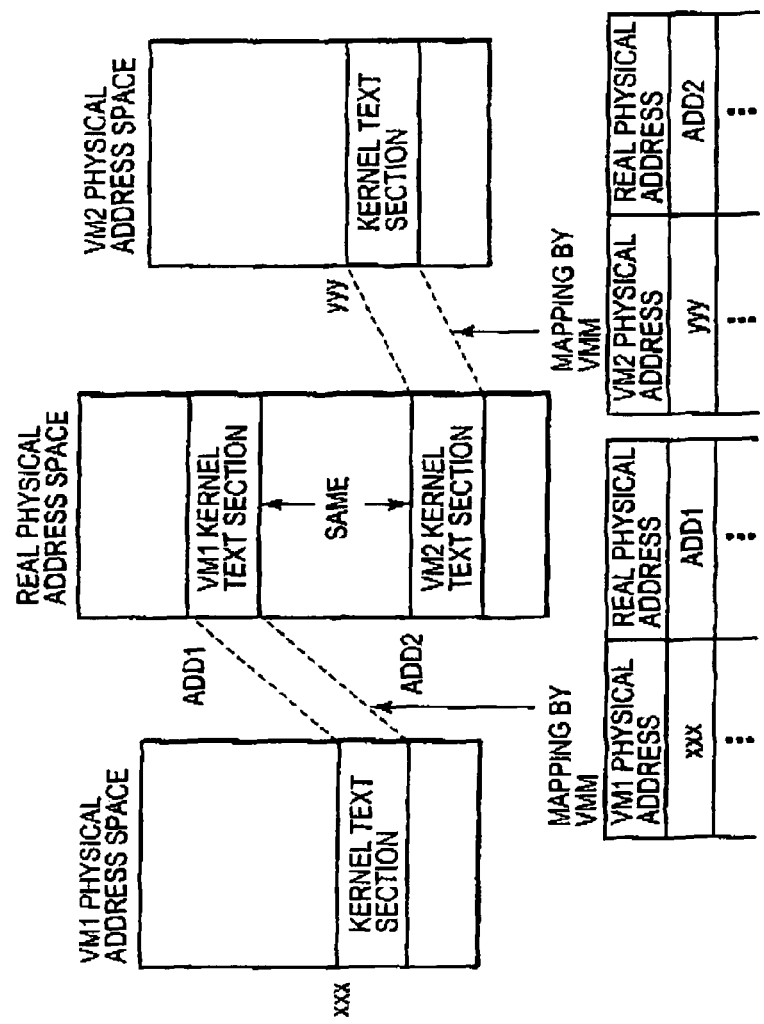
FIG. 1 is a schematic diagram showing the allocation of memory resources in a virtual machine environment of the related art.
Figure 2:
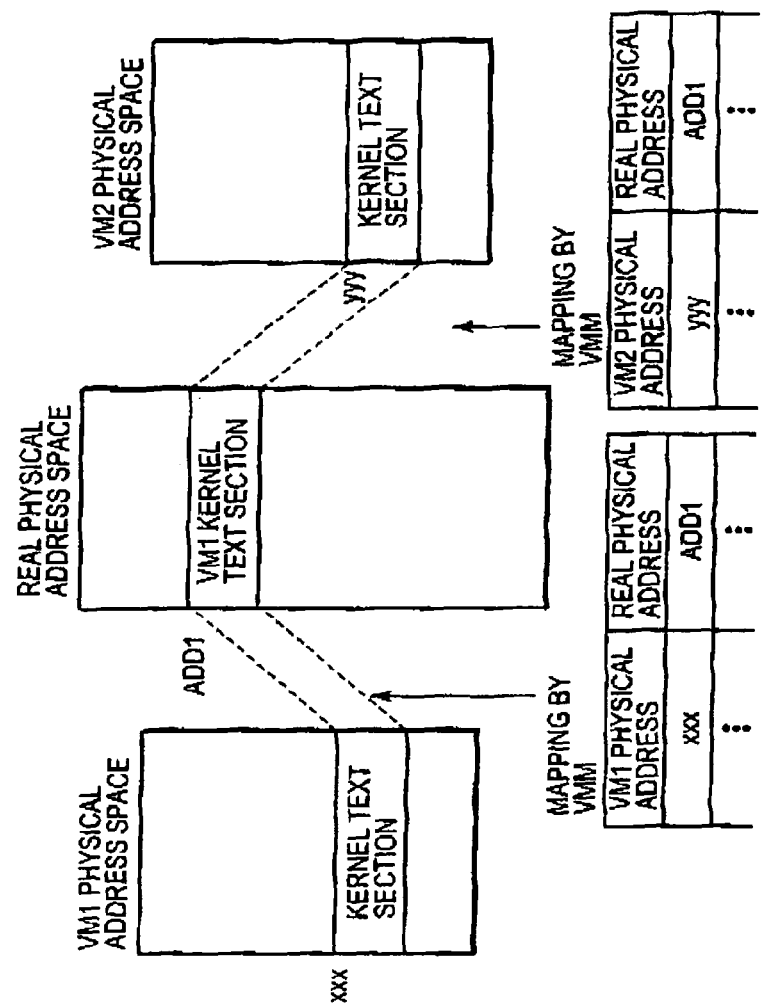
FIG. 2 is a schematic diagram showing the sharing of a memory image in the virtual machine environment of the related art.
Figure 3:
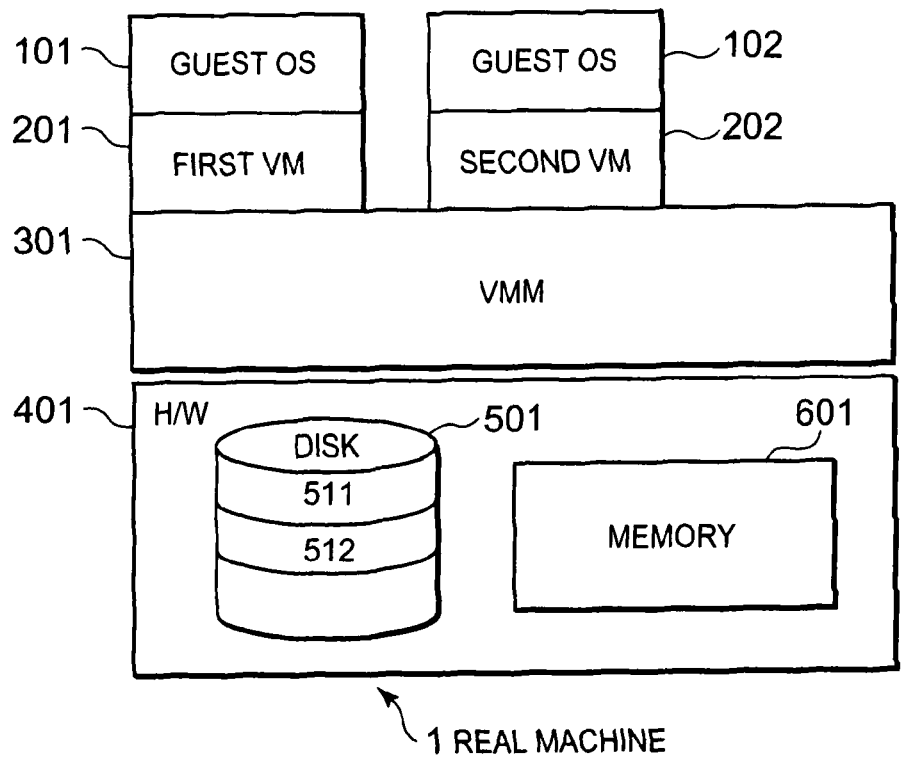
FIG. 3 is a block diagram showing a configuration of a virtual machine system according to one exemplary embodiment of the invention.

FIG. 3 is a block diagram schematically showing a virtual machine system according to a first exemplary embodiment of the invention. A real machine 1 includes a hardware resource (H/W) 401. The hardware resource 401 includes a physical disk 501 and a physical memory (RAM) 601. A virtual machine monitor (VMM) 301 is implemented on the real machine 1. The VMM 301 constructs plural virtual machines (VMs) on the real machine 1, and controls the operations of these VMs.

For example, in FIG. 3, the VMM 301 provides the first virtual machine 201 and the second virtual machine 202. A guest OS 101 is installed on the first virtual machine 201, and a guest OS 102 is installed on the second virtual machine 202. The areas where the guest OS 101 and the guest OS 102 are installed are disk areas 511 and 512 on the physical disk 501, respectively. The disk areas 511 and 512 are allocated to the virtual machines 201 and 202, respectively, by the VMM 301.

Upon startup of the guest OS 101, the VMM 301 reads a kernel image KNL1 of the guest OS 101 from the disk area 511, and loads the kernel image KNL1 on the physical memory 601. Upon startup of the guest OS 102, the VMM 301 reads a kernel image KNL2 of the guest OS 102 from the disk area 512, and loads the kernel image KNL2 on the physical memory 601.

1-2. VMM

The VMM 301 automatically determines whether the sharing of the kernel image (kernel text section) is possible or not in startup of the guest OS. Thus, the VMM 301 of the invention has the following functions.

(First Function)

When loading the kernel image of the guest OS on the physical memory 601, the VMM 301 records a real physical address (top address) in the physical memory 601, and the size of the kernel image.

(Second Function)

When a kernel image of the guest OS is newly loaded on the physical memory 601, the VMM 301 checks whether or not the kernel image newly loaded is the same as the kernel image already loaded exists on the physical memory 601 based on a management table 701 which represents a state of the kernel image loaded on the physical memory 601. When the kernel image has already been loaded by the VMM 301, the VMM 301 compares the kernel image newly loaded with the kernel image already loaded. The VMM 301 refers to information recorded by the first function.

(Third Function)

When the kernel image newly loaded is the same as the kernel image already loaded, the VMM 301 changes memory mapping regarding the top address of the kernel image newly loaded into memory mapping regarding the top address of the kernel image already loaded. And the VMM 301 frees up the memory area where the kernel image newly loaded.

Figure 4:
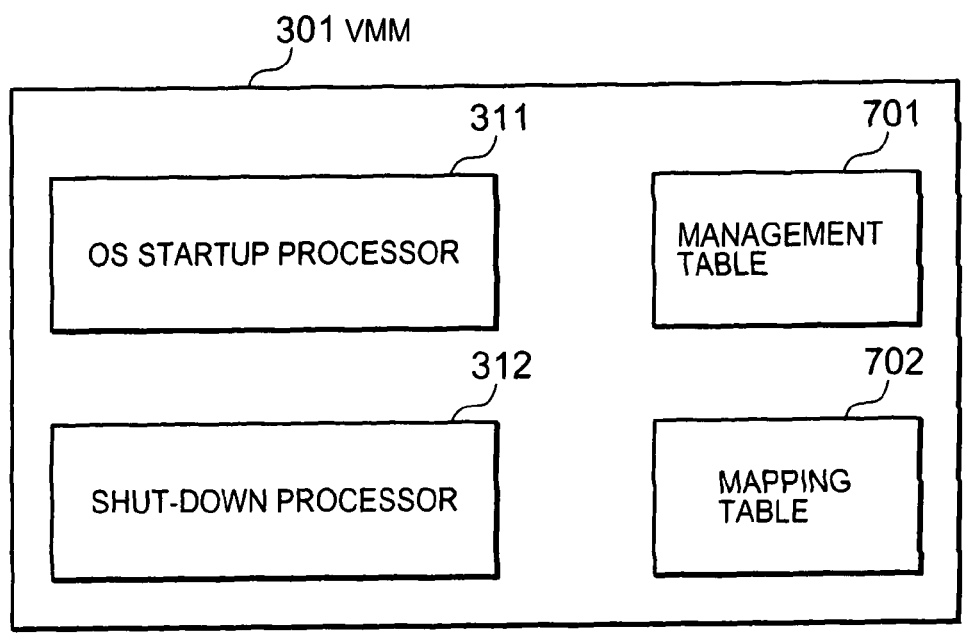
FIG. 4 is a block diagram showing a configuration of a VMM according to a first exemplary embodiment of the invention.

FIG. 4 is a block diagram showing the VMM 301 according to the first exemplary embodiment of the invention. The VMM 301 has an OS startup processor 311 and a shut-down processor 312. The OS startup processor 311 is a module for performing a startup process of the guest OS including the first to third functions as mentioned above. The shut-down processor 312 is a module for performing a shut-down process of the guest OS. The operation of each element will be described in detail below. Furthermore, the VMM 301 has a management table 701 and a mapping table 702.

FIG. 5 shows an example of the management table 701. The management table 701 is composed of plural entries. Each entry represents a state of each kernel image (kernel text section) loaded on the physical memory 601. More specifically, each entry includes an ID of the guest OS, a real physical address (top address) where the kernel image is loaded, the size of the kernel image loaded, and a reference counter CNT.

The real physical address and the size of the kernel image are obtained by the first function. In the second function, the kernel image newly loaded is compared with the kernel image already loaded based on the management table 701. The reference counter CNT represents the number of guest OSs which is using the kernel image. When the reference counter CNT becomes "0", the memory area of the kernel image is freed up. That is, the reference counter CNT is a parameter used in the third function for determining whether the memory area where the kernel image is loaded may be freed up or not. The management table 701 is used to achieve the first to third functions. In other words, the VMM 301 can provide the first to third functions thanks to the management table 701, which will be described in detail below.

FIG. 6 shows an example of the mapping table 702. The mapping table 702 shows a relationship between the VM physical address and the real physical address. The mapping table 702 is composed of plural entries, and each entry includes the ID of the guest OS, the VM physical address, and the real physical address. For example, in FIG. 6, the VM physical address "xxx" on the VM physical address space is mapped to the real physical address "ADD1" on the physical memory 601. When the guest OS 101 accesses the VM physical address "xxx", the VMM 301 refers to the mapping table 702 to obtain the real physical address "ADD1" corresponding to the VM physical address "xxx" designated. The VMM 301 accesses the real physical address "ADD1" on the physical memory 601 to read out targeted data. The VMM 301 sends the data to the guest OS 101.

Figure 7:
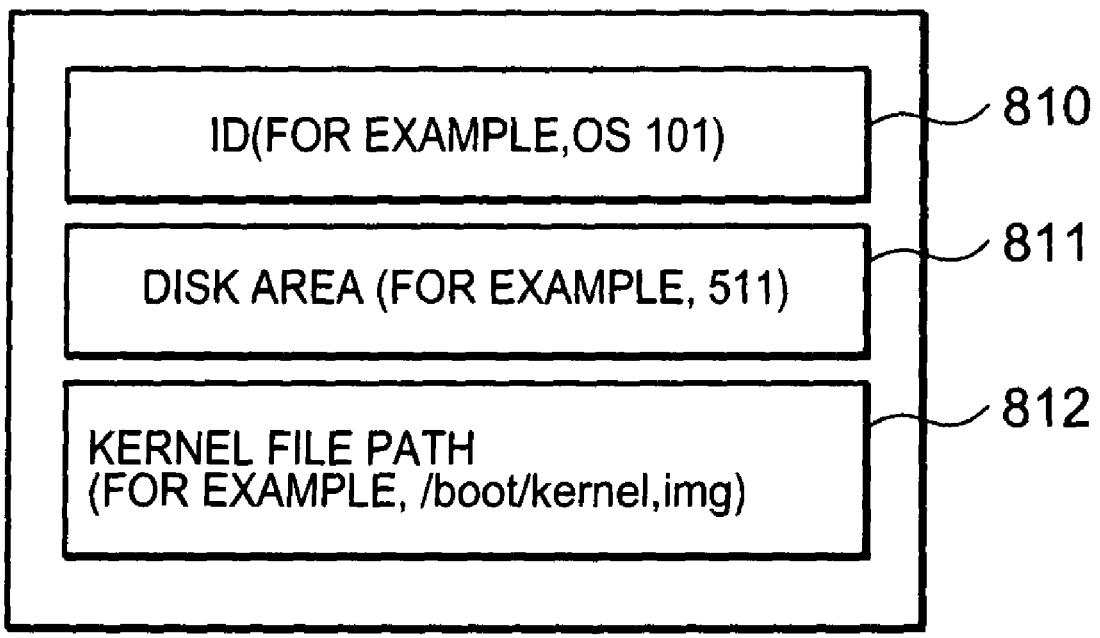
FIG. 7 is a schematic diagram showing a guest OS startup parameter.

FIG. 7 schematically shows contents of a guest OS startup parameter 801. The guest OS startup parameter 801 is information required when the OS startup processor 311 of the VMM 301 performs the startup process of the guest OS. The guest OS startup parameter 801 includes an ID 810 of the guest OS to be started up, a disk area 811 allocated to the guest OS, and a kernel file path 812 indicating where the kernel image of the guest OS is stored. In an example shown in FIG. 7, a disk area 511 is mounted on the guest OS 101, and a file "/boot/kernel.img" on the disk area 511 is read out as the kernel image.

2. Process Flow

Now, the startup process and the shut-down process of the guest OS by the VMM 301 according to the first exemplary embodiment of the invention will be described with reference to the accompanying drawings and the following flowcharts. Specific examples of operations will be described in the following third section.

2-1. Startup (Boot) Process of Guest OS

Figure 8:
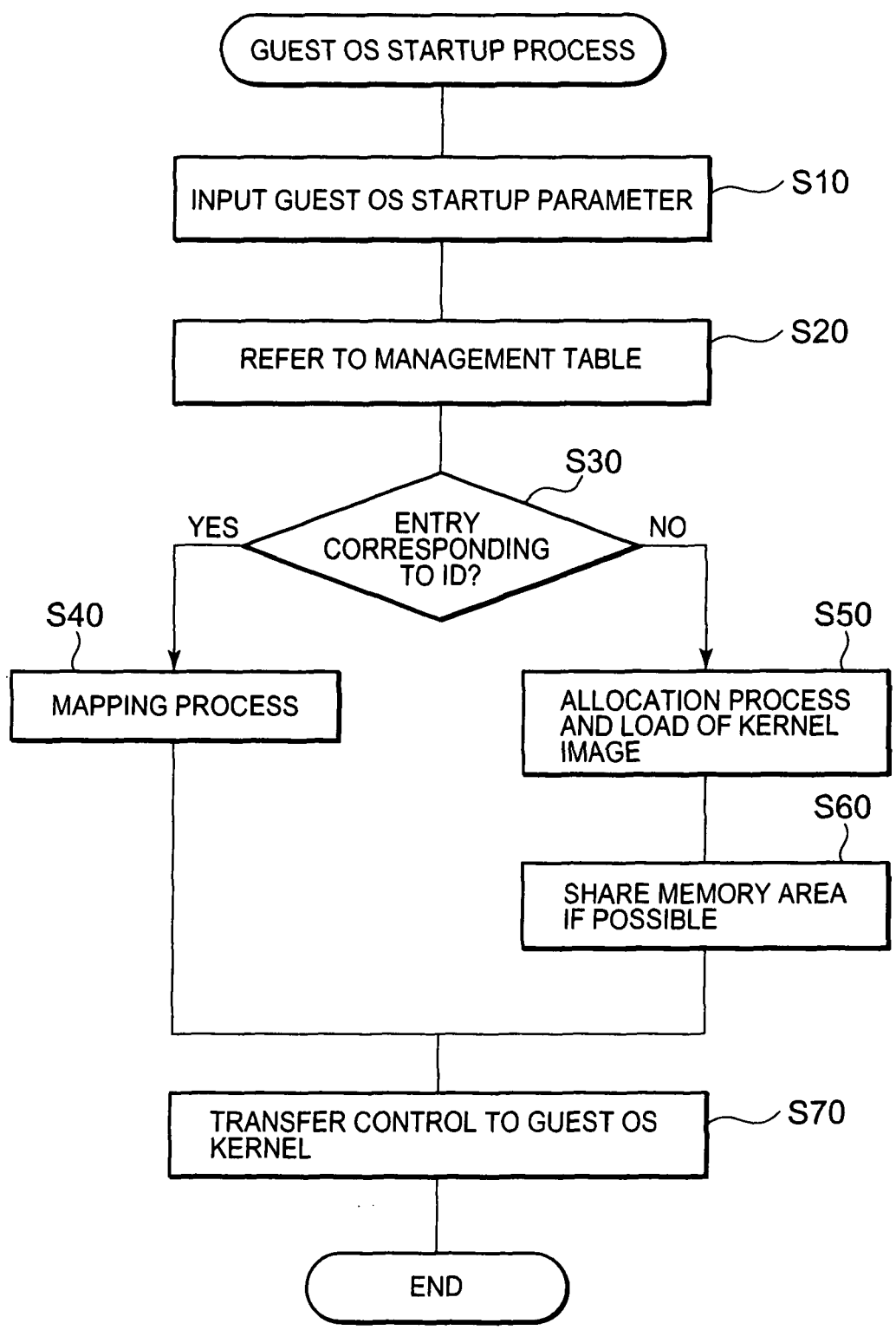
FIG. 8 is a flowchart showing a startup process of the guest OS.

FIG. 8 is a flowchart showing a startup process of the guest OS in the first exemplary embodiment of the invention. First, the guest OS startup parameter 801 (see FIG. 7) is input to the OS startup processor 311 of the VMM 301 (step S10). The guest OS startup parameter 801 represents the ID 810 of the guest OS to be started up, the disk area 811, and the kernel file path 812. The OS startup processor 311 refers to the management table 701 in response to inputs of the ID 810 (step S20). The OS startup processor 311 searches for an entry matching the ID 810 from the management table 701 (step S30).

When the management table 701 includes the entry matching the ID 810 (Yes in step S30), this state means that the kernel image of the guest OS already exists in the physical memory 601. In this case, the normal guest OS startup process is omitted, and a special process is executed (step S40). In contrast, when the entry matching the ID 810 is not included in the management table 701 (No in step S30), the kernel image of the guest OS does not exist in the physical memory 601. Therefore, the normal guest OS startup process is executed (step S50, step S60). When the startup process of the guest OS is completed, the control is transferred from the VMM 301 to the guest OS kernel (step S70).

Figure 9:
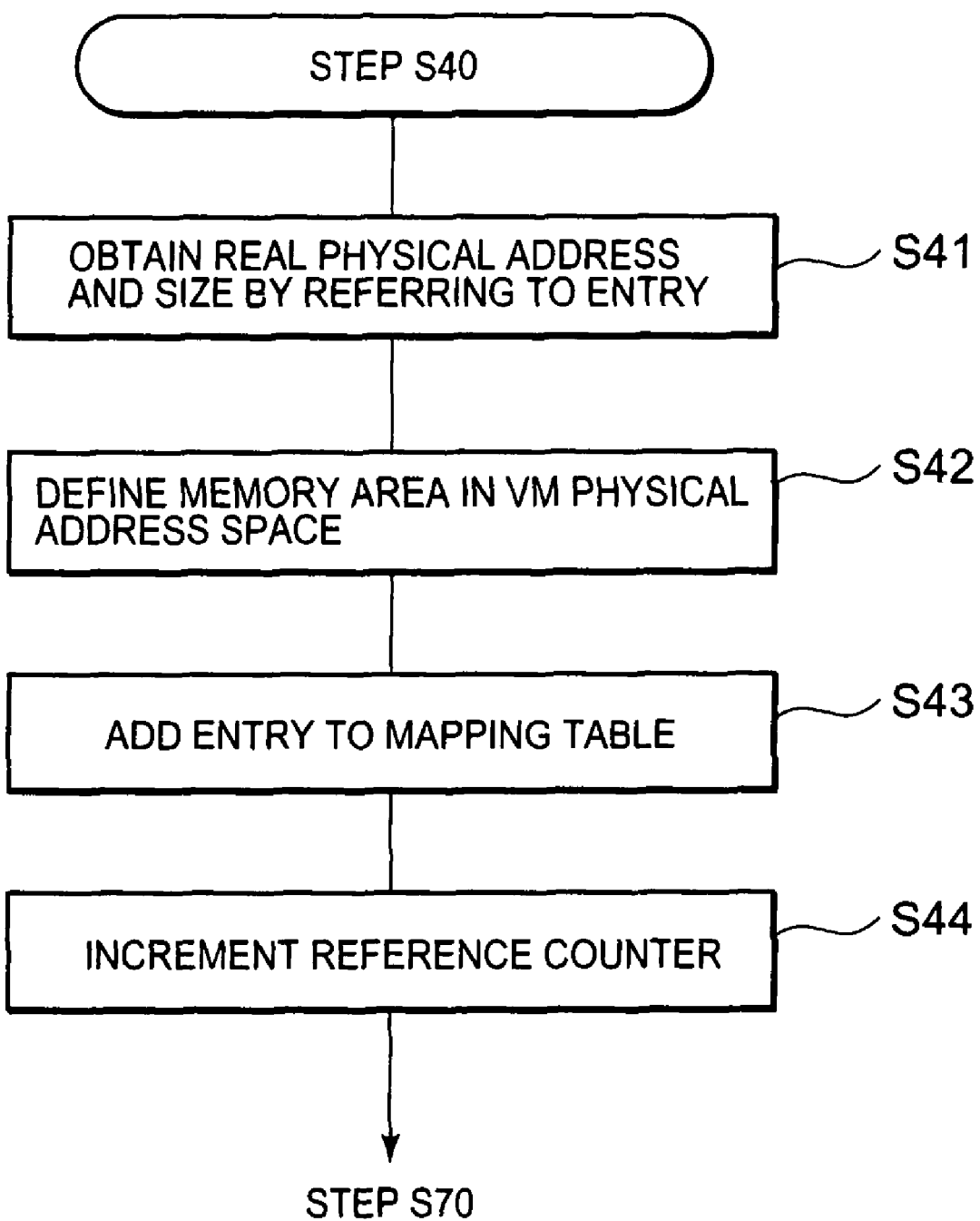
FIG. 9 is a flowchart showing contents of step S40 in FIG. 8

Step S40:

FIG. 9 is a flowchart showing the details of step S40. When the step S40 is executed, the entry matching ID 810 is included in the management table 701. Thus, the OS startup processor 311 can obtain the real physical address (top address) of the kernel image loaded and the size of the kernel image loaded, by referring to the matching entry.

Then, the OS startup processor 311 defines the memory area in the VM physical address space based on the size of the kernel image loaded (step S42). Thus, the VM physical address corresponding to the real physical address (top address) is set. The OS startup processor 311 adds the entry indicating the relationship between the real physical address obtained and the VM physical address obtained, to the mapping table 702 (step S43). The ID of the added entry is the ID 810 designated by the guest OS startup parameter 801. This completes the setting of the mapping.

Furthermore, the OS startup processor 311 increments the reference counter CNT of the matching entry in the management table 701 (step S44). The term "increment" as used herein means an operation of adding one to a value of the reference count CNT. Thereafter, the operation is transferred to step S70.

Figure 10:
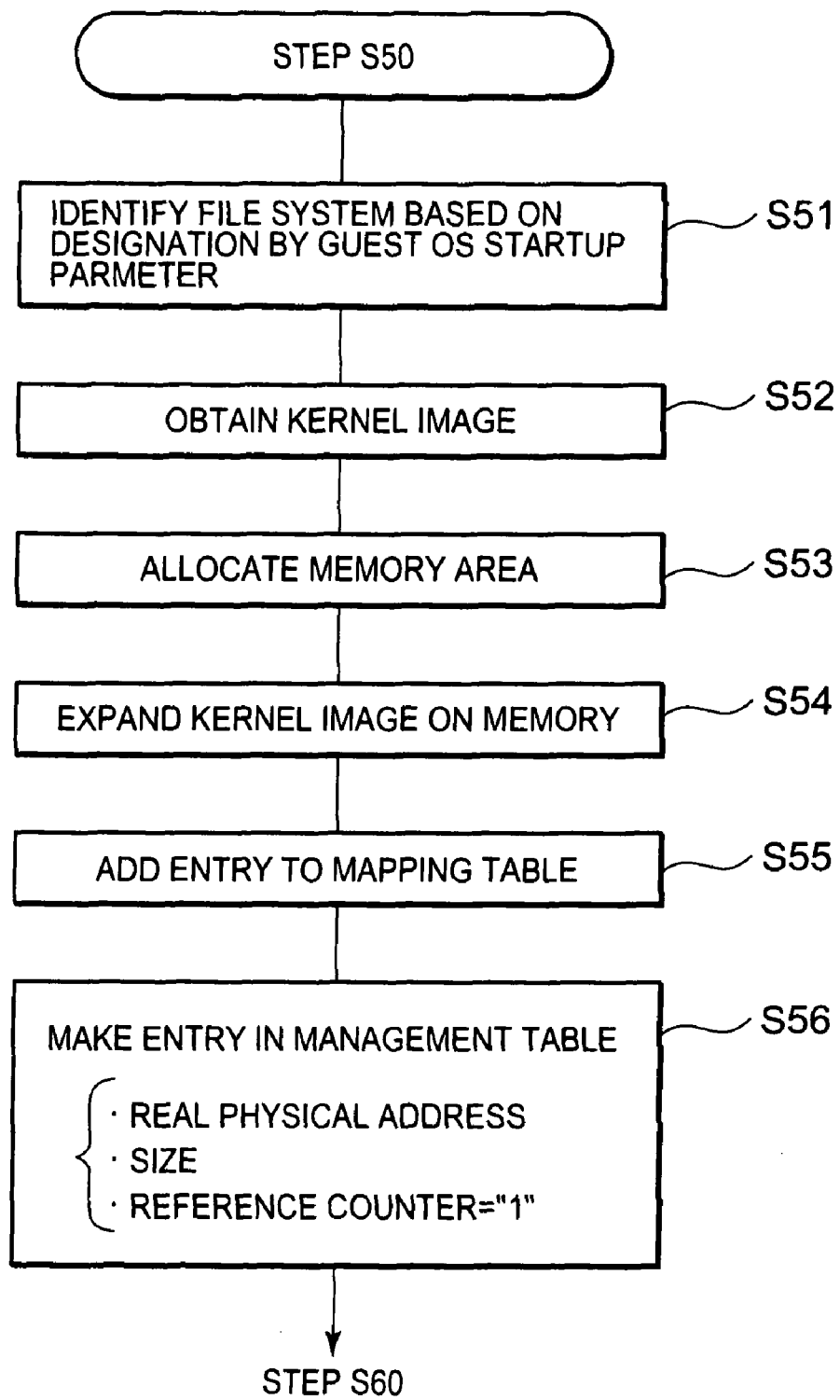
FIG. 10 is a flowchart showing contents of step S50

Step S50:

FIG. 10 is a flowchart showing the details of step S50. Now, the guest OS startup parameter 801 is input to the OS startup processor 311. The guest OS startup parameter 801 includes the disk area 811 allocated to the guest OS and the kernel file path 812.

The OS startup processor 311 can identify the file system on the physical disk 501 based on the designation of the disk area 811 in the parameter 801 (step S51). For example, the OS startup processor 311 identifies a file system of the disk area 511 designated on the physical disk 501. Then, the OS startup processor 311 reads out the kernel image of the guest OS based on the kernel file path 812 designated (step S52). In this way, the OS startup processor 311 can obtain the kernel image and the size thereof.

Then, the OS startup processor 311 ensures the memory areas in the real physical address space and the VM physical address space based on the size of the kernel image loaded (step S53). The top addresses of the ensured (allocated) memory areas are used as the "real physical address" and "VM physical address", respectively. The OS startup processor 311 expands the kernel image on the physical memory 601 (step S54). That is, the OS startup processor 31 loads the kernel image on the memory area allocated on the physical memory 601.

The OS startup processor 311 adds an entry indicating a relationship between the real physical address and the VM physical address to the mapping table 702 (step S55). The ID of the added entry is the ID 810 designated by the guest OS startup parameter 801. The setting of the mapping ends.

Furthermore, the OS startup processor 311 makes the entry of the guest OS in the management table 701 (step S56). The ID of the entry is the ID 810 designated by the guest OS startup parameter 801. Values obtained in the above-mentioned step are written as the real physical address and the size thereof. The reference counter CNT representing the number of guest OSs using the kernel image is set to "1". Thereafter, the process proceeds to step S60.

Step S60

Figure 11:
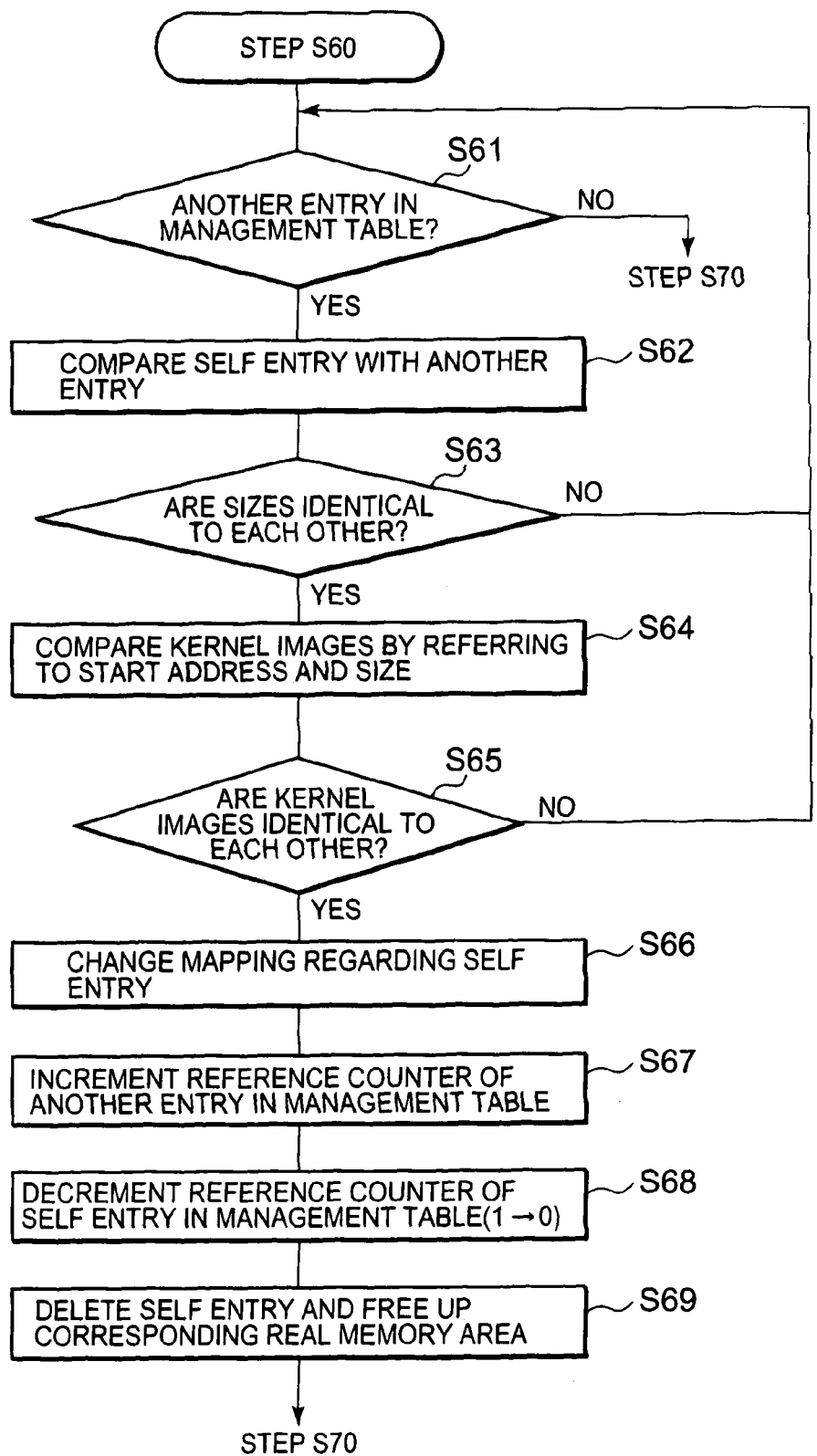
FIG. 11 is a flowchart showing contents of step S60.

FIG. 11 is a flowchart showing the details of step S60. First, the OS startup processor 311 refers to the management table 701. In the management table 701, the entry of the guest OS to be started, that is, the entry designated by the ID 810 is referred to as a "self entry". In contrast, an entry other than the self entry is referred to as "other entry". When, except for the self entry, there is no other entry in the management table 701 (No in step S61), the process proceeds to step S70. In contrast, when the other entry exists in the management table 701 (Yes in step S61), the OS startup processor 311 compares the self entry with the other entry (step S62).

First, the OS startup processor 311 compares the size represented by the self entry with the size represented by the other entry (step S63). When the sizes are not equal to each other (No in step S63), the process returns to step S61, and then the same process is applied to other entries.

In contrast, when the sizes are equal (Yes in step S63), the OS startup processor 311 compares the kernel image of the self entry with the kernel image of the other entry (step S64). In this comparison, the real physical address (start address of the kernel image) and size represented in the entry are used. That is, the OS startup processor 311 can compare with a memory image by the size from the start address on the physical memory 601. When the kernel images are not equal to each other (No in step S65), the process returns to step S61, and then the same process is applied to other entries.

When the kernel images are equal to each other (Yes in the step S65), it is possible to share the kernel image. Thus, the OS startup processor 311 changes mapping regarding the self entry (step S66). Specifically, the OS startup processor 311 replaces the real physical address of the self entry in the mapping table 702 by the real physical address of the other entry in the management table 701. Thus, mapping is applied to the kernel image of the other entry when the guest OS accesses the kernel image. That is, the sharing of the memory area (kernel image) is automatically achieved.

The OS startup processor 311 increments the reference counter CNT of the other entry in the management table 701 (step S67). At the same time, the OS startup processor 311 decrements the reference counter CNT of the self entry in the management table 701 (step S68). The term "decrement" as used herein means an operation of subtracting one from the value of the reference count CNT. In the step S56, the reference counter CNT of the self entry is set to "1". Thus, in step S68, the reference counter CNT of the self entry is set to "0". The reference counter CNT of "0" means that there is no guest OS using the corresponding kernel image. Then, this entry is deleted, and the corresponding real memory area is freed up (step S69). This saves the memory resources of the physical memory 601.

2-2. Shut-down Process

Figure 12:
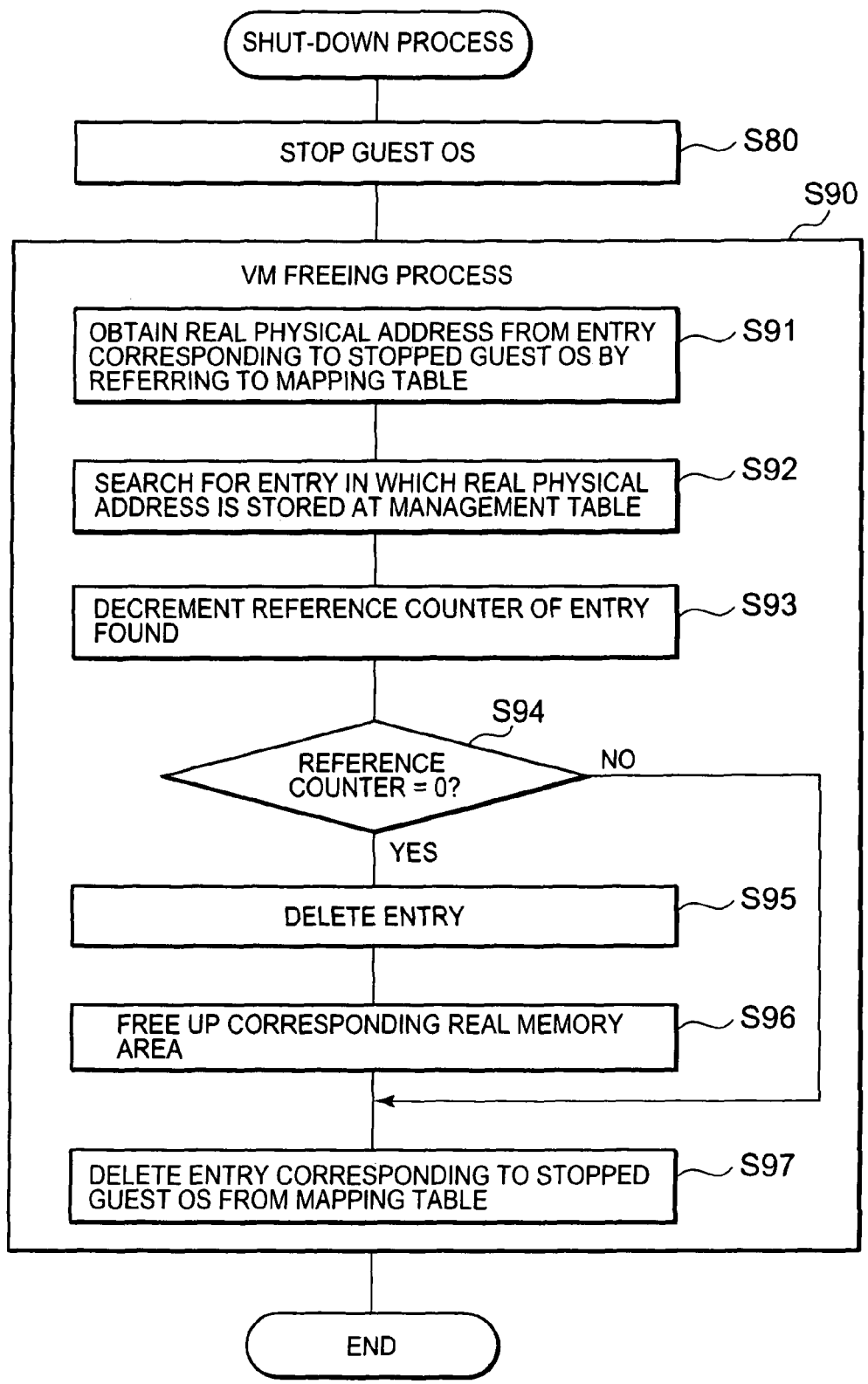
FIG. 12 is a flowchart showing a shut-down process of the guest OS.

FIG. 12 is a flowchart showing a shut-down process of the guest OS in the first exemplary embodiment of the invention. First, the shut-down processor 312 of the VMM 301 stops the operation of the guest OS (step S80). After stopping the operation of the guest OS, the shut-down processor 312 frees up the VM in which the guest OS is operated (step S90).

First, the shot-down processor 312 searches for an entry of the stopped guest OS based on the ID of the guest OS by referring to the mapping table 702. Thus, the shut-down processor 312 obtains the real physical address represented by the entry searched (step S91). Then, the shut-down processor 312 searches for an entry in which the real physical address obtained at step S91 is stored by referring to the management table 701 (step S92). The entry in which the real physical address is stored is uniquely defined.

Then, the shut-down processor 312 decrements the reference counter CNT of the entry found (step S93). When the reference counter CNT becomes "0" as a result (Yes in step S94), this state means that there is no guest OS using the kernel image loaded into this real physical address. Thus, the shut-down processor 312 deletes the entry (step S95), and frees up the corresponding real memory area (step S96). In contrast, when the reference counter CNT does not become "0" (No in step S94), the kernel image is still necessary. Thus, the deletion of the entry or freeing up of the memory area is not performed.

The shut-down processor 312 changes the mapping table 702. Specifically, the shut-down processor 312 deletes the entry of the guest OS stopped from the mapping table 702 (step S97). In this way, the VM is freed up.

3. Examples of Operation

Next, examples of operation of the virtual machine system according to the first exemplary embodiment of the invention will be described with reference to the described flowchart and FIGS. 13 to 20. FIGS. 13 to 20 correspond to FIG. 3, and thus overlapping description will be omitted.

3-1. First Example

Figure 13:
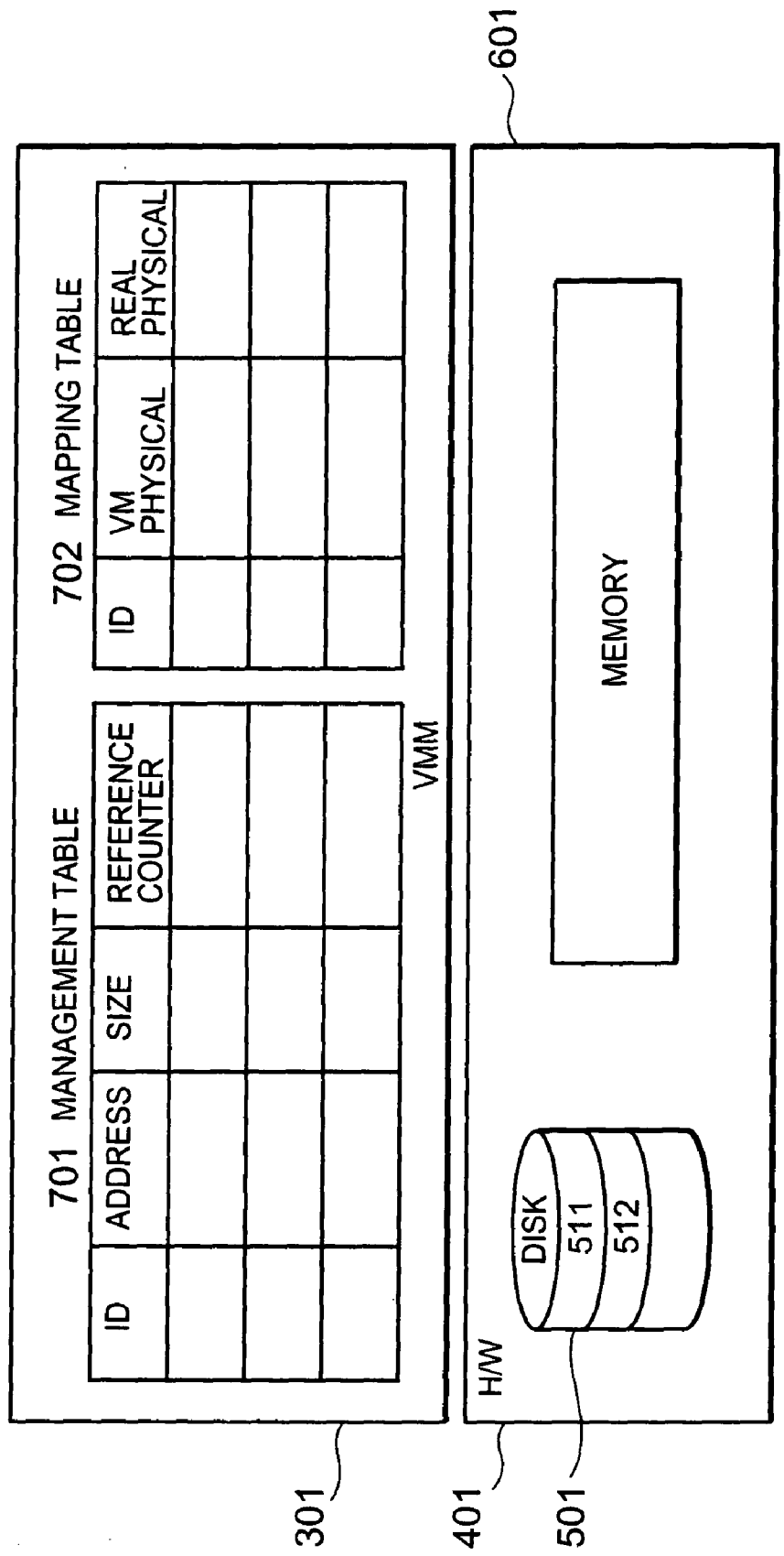
FIGS. 13-20 are diagrams explaining examples of an operation of the virtual machine system.

FIG. 13 shows an initiation state of an operational example to be described below. First, a user requests startup of the guest OS 101. In response to the request, the guest OS startup parameter 801 is input to the VMM 301 (step S10). The guest OS startup parameter 801 indicates "ID: OS 101, disk area: 511, kernel file path: predetermined path". The VMM 301 refers to the management table 701 (step S20). At this time, the entry matching "ID: OS 101" is not included in the management table 701 (No in step S30). Thus, the process proceeds to step S50.

Figure 14:
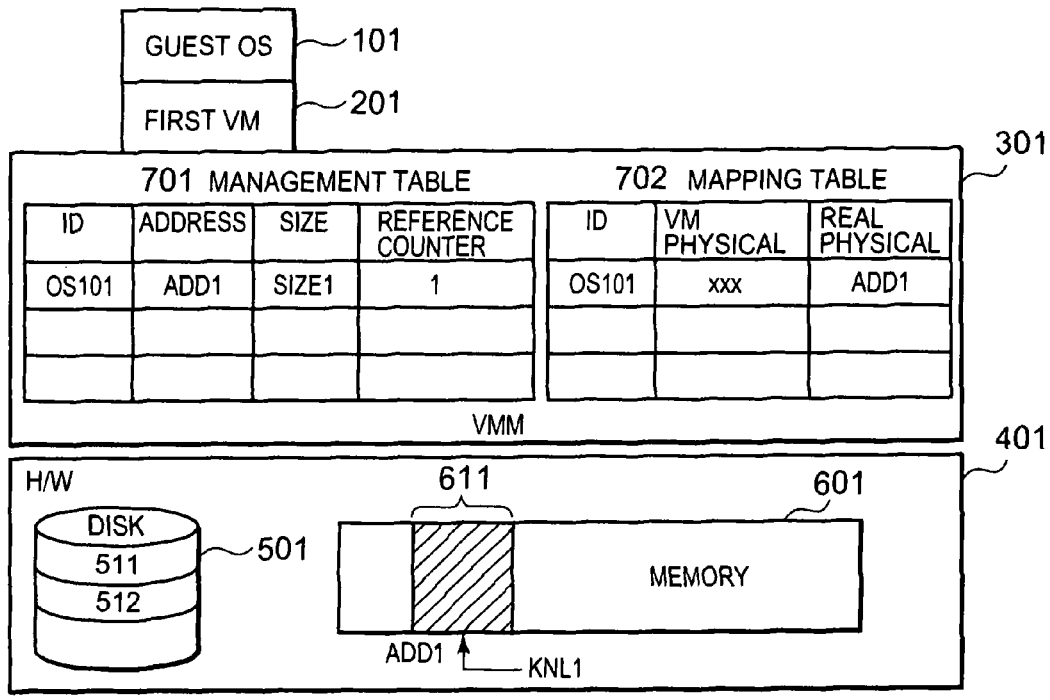

FIG. 14 shows a state in step S50. The VMM 301 accesses the kernel file path designated on the disk area 511 specified to obtain a kernel image KNL1 (steps S51, S52). The size of the kernel image KNL1 is represented as "SIZE1". Then, the memory area corresponding to the kernel image KNL1 is allocated to the guest OS 101 (step S53). For example, a memory area 611 starting from the real physical address "ADD1" is ensured in the physical memory 601. A memory area starting from the address "xxx" is ensured in the VM physical address space.

Then, the VMM 301 loads the kernel image KNL1 into the memory area 611 allocated onto the physical memory 601 (step S54). The VMM 301 adds the entry "ID: OS 101, VM Physical Address: xxx, Real Physical Address: ADD1" to the mapping table 702 (step S55). Further, the VMM 301 makes a new entry "ID: OS 101, Address: ADD1, Size: SIZE1, Reference Counter: 1" to the management table 701 (step S56).

Then, the process proceeds to step S60. The VMM 301 refers to the management table 701. At this time, no other entry exists in the management table 701 (No in step S61). Thus, the process proceeds to step S70, the startup process of the guest OS 101 ends.

Next, the user requests startup of the guest OS 102. The guest OS startup parameter 801 input indicates "ID: OS 102, Disk Area: 512, Kernel File Path: Predetermined Path" (step S10). The entry matching "ID: OS 102" at this time is not included in the management table 701 (No in step S30). Thus, the process proceeds to step S50.

Figure 15:
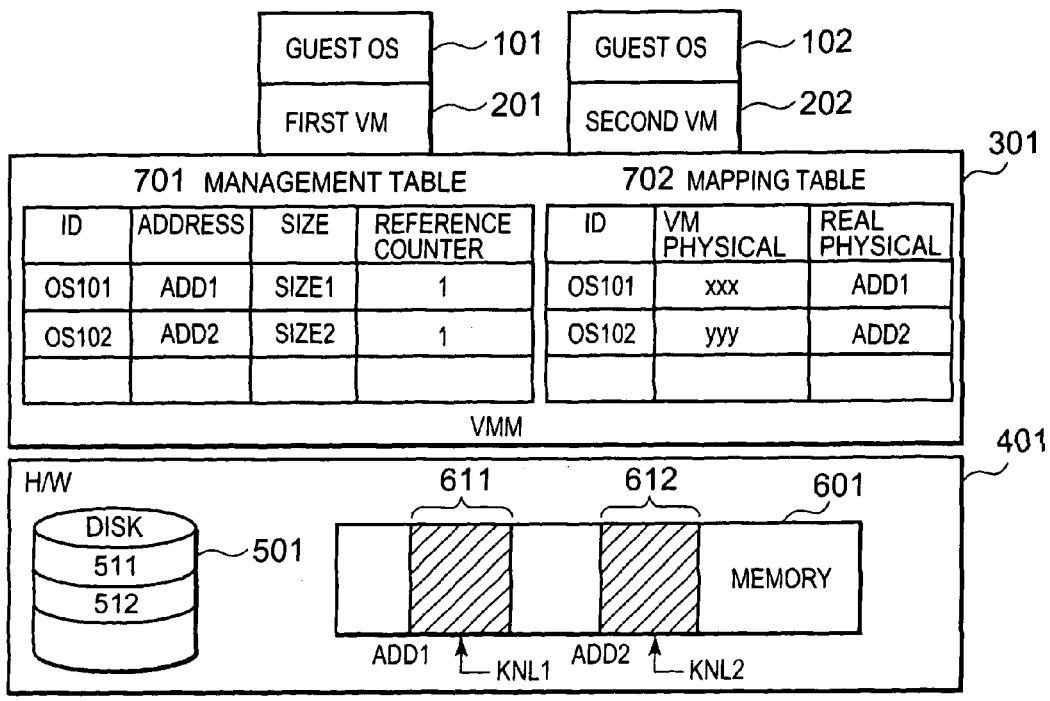

FIG. 15 shows a state in step S50. The VMM 301 performs the same process as the startup process of the guest OS 101. The kernel image KNL2 (size=SIZE2) is obtained from the disk area 512. A memory area 612 starting from the real physical address "ADD2" is ensured in the physical memory 601. A memory area starting from the address "yyy" is ensured in the VM physical address space. The kernel image KNL2 is loaded on the memory area 612. The entry "ID: OS 102, VM Physical Address: yyy, Real Physical Address: ADD2" is added to the mapping table 702. Furthermore, a new entry "ID: OS 102, Address: ADD2, Size: SIZE2, Reference Counter:1" is added to the management table 701.

Thereafter, the process proceeds to step S60. The VMM 301 refers to the management table 701. This time, the other entry (ID: OS 101) exists in the management table 701 (Yes at step S61). Thus, the VMM 301 compares the self entry (ID: S102) with the other entry (ID: OS 101) (step S62). The size SIZE1 is equal to the size SIZE2 (Yes in step S63). The kernel image KNL1 is equal to the kernel image KNL2 (Yes in step S65).

Figure 16:
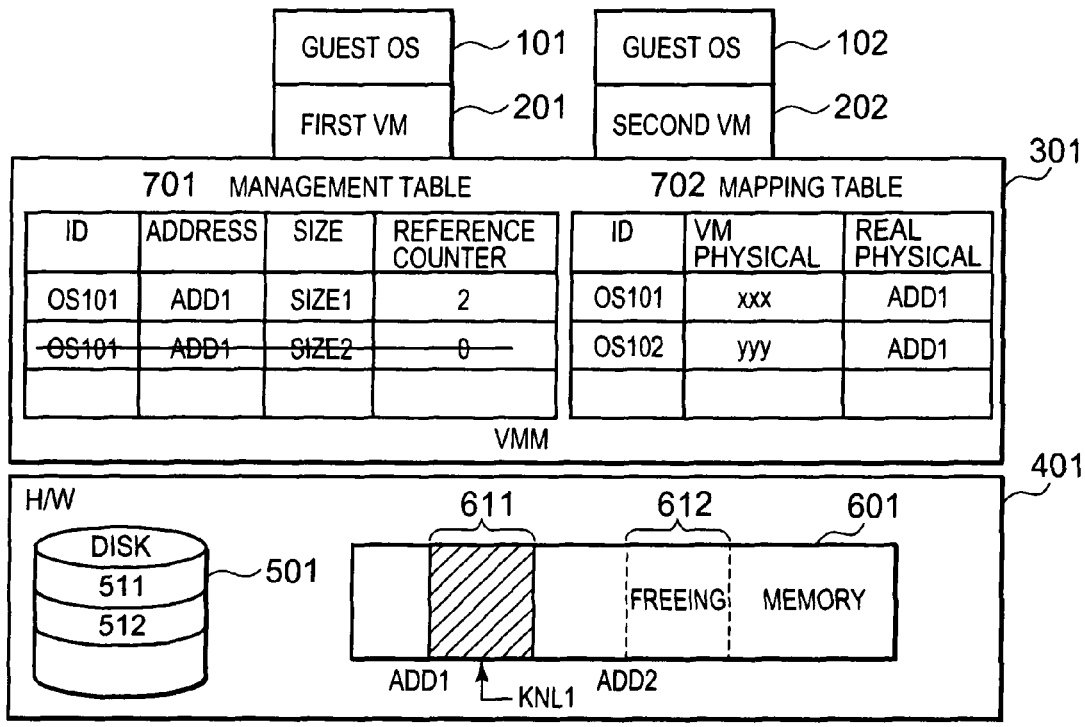

Thus, as shown in FIG. 16, the VMM 301 changes the real physical address of the self entry (ID: OS 102) in the mapping table 702 from "ADD2" to "ADD1" (step S66). Thus, the memory area 611 is automatically shared between the guest OSs 101 and OS 102.

Furthermore, the VMM 301 changes the reference counter CNT in the management table 701. Specifically, the VMM 301 increments the reference counter CNT of the other entry (ID: OS 101) (step S67). As a result, the reference counter CNT of the other entry becomes "2". This means that two guest OSs (101, 102) is using the kernel image KNL1 corresponding to the address ADD1. In contrast, the VMM 301 decrements the reference counter CNT of the self entry (ID: OS 102) (step S68). As a result, the reference counter CNT of the self entry becomes "0". This means that there is no guest OS using the kernel image KnL2 corresponding to the address ADD2. Thus, the self entry is deleted, and the corresponding memory area 612 is freed up (step S69).

Then, the process proceeds to step S70, the startup process of the guest OS 102 ends.

Next, the user gives an instruction to shut down the guest OS 102 in the state shown in FIG. 16. The VMM 301 stops the operation of the guest OS 102 in response to the instruction (step S80). Further, the VMM 301 finds out an entry "ID: OS 102, VM Physical Address: yyy, Real Physical Address: ADD1" of the guest OS 102 from the mapping table 702 (step S91).

Figure 17:
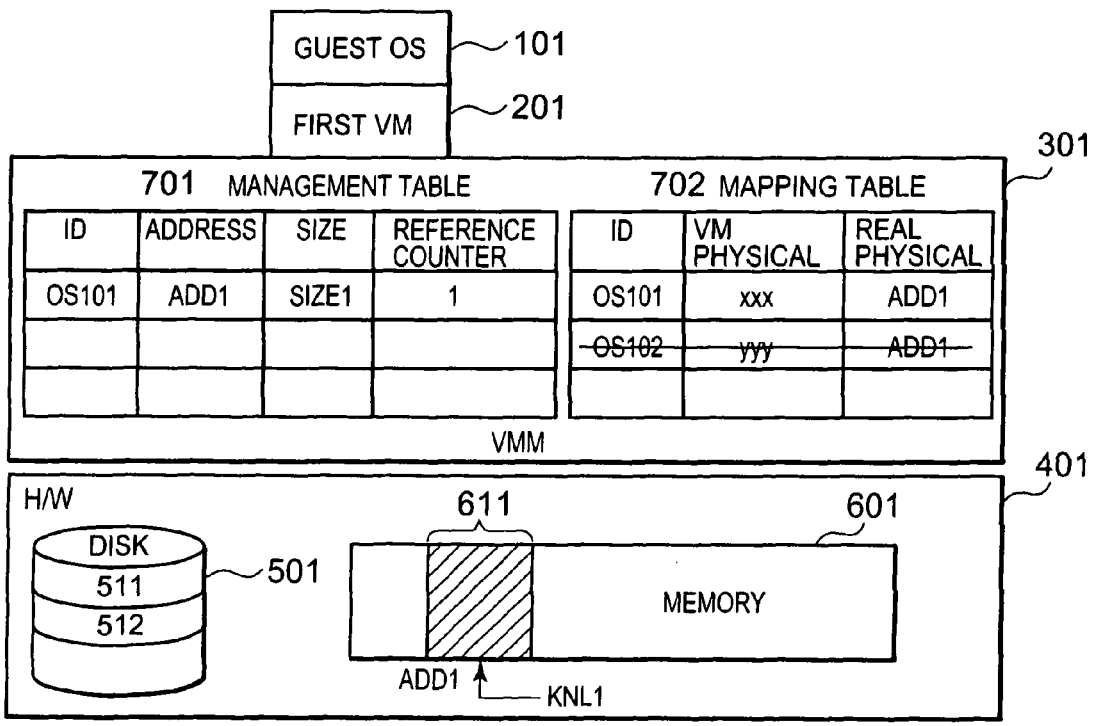

Then, the VMM 301 searches the real physical address "ADD1" on the management table 701 (step S92). As a result, the entry "ID: OS 101, Address: ADD1, Size: SIZE1, Reference Counter: 2" is found out. Thus, the VMM 301 decrements the reference counter CNT of the entry (step S93). As a result, as shown in FIG. 17, the reference counter CNT is changed from "2" to "1" (No in step S94). In this case, the memory area is not freed up because the guest OS 101 is using the memory area. The VMM 301 deletes the entry "ID: OS 102, VM Physical Address: yyy, Real Physical Address: ADD 1" of the stopped guest OS 102 from the mapping table 702 (step S97).

Then, it is assumed that the user instructs the VMM 301 to shut down the guest OS 101 in the state shown in FIG. 17. In response to the instruction, the VMM 301 stops the operation of the guest OS 101 (step S80). Furthermore, the VMM 301 finds out the entry "ID: OS 101, VM Physical Address: xxx, Real Physical Address: ADD1" of the guest OS 101 from the mapping table 702 (step S91).

Figure 18:
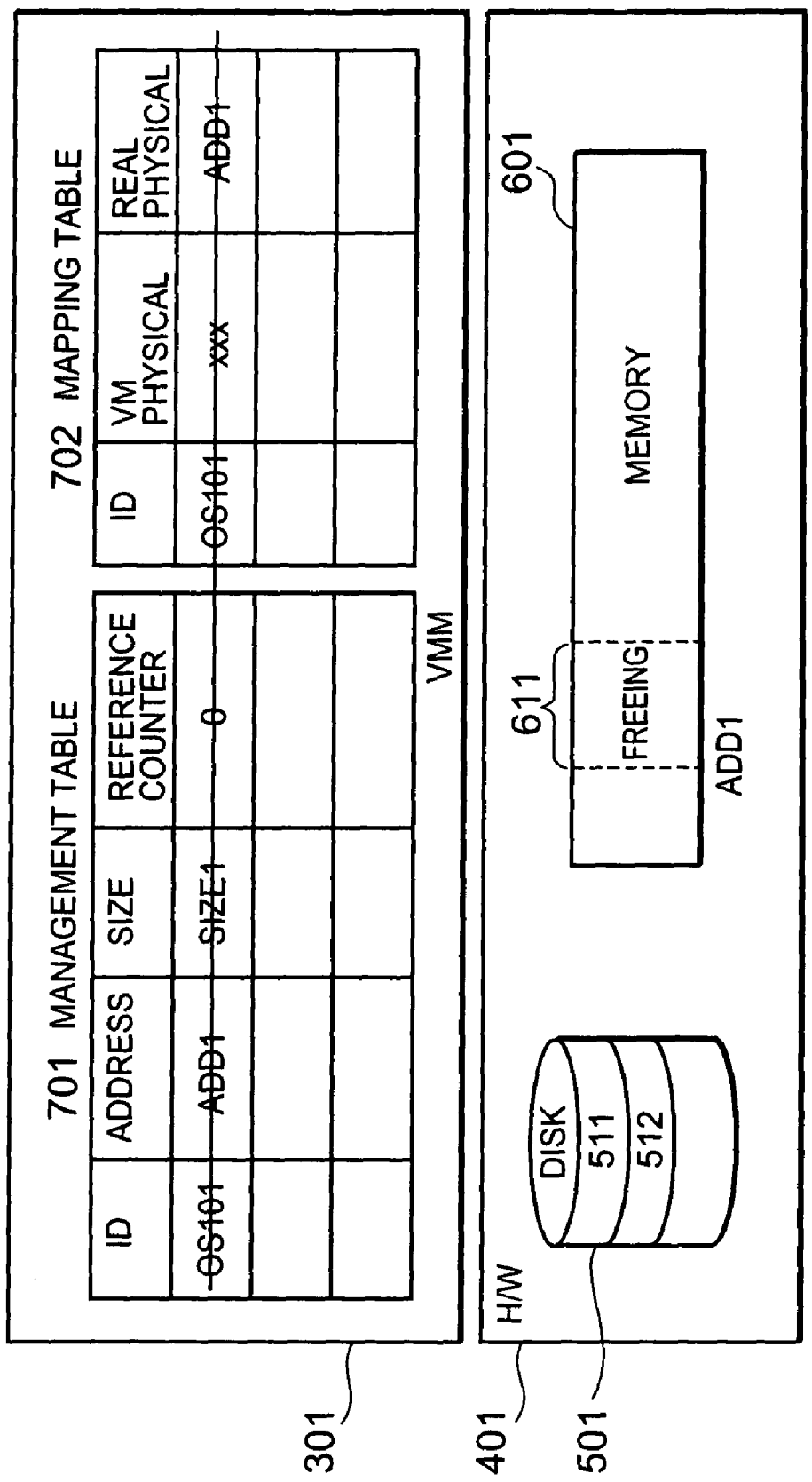

Then, the VMM 301 searches the real physical address "ADD1" on the management table 701 (step S92). As a result, the entry "ID: OS 101, Address: ADD1, Size: SIZE1, Reference Counter: 1" is found out. Thus, the VMM 301 decrements the reference counter CNT of the entry (step S93). As a result, as shown in FIG. 18, the reference counter CNT is changed from "1" to "0" (Yes in step S94). This means that there is no guest OS using the kernel image KnL1 corresponding to the address ADD1. Therefore, the VMM 301 deletes this entry (step S95), and frees up the corresponding memory area 611 (step S96). The VMM 301 deletes the entry "ID: OS 101, VM Physical Address: xxx, Real Physical Address: ADD 1" of the stopped guest OS 101 from the mapping table 702 (step S97).

3-2. Second Example

In the first exemplary example, the guest OS 102 is first shut down from the state shown in FIG. 16. In a second example, the guest OS 101 is first shut down from the state shown in FIG. 16.

The user instructs the VMM 301 to shut down the guest OS 101 in the state shown in FIG. 16. The VMM 301 stops the operation of the guest OS 101 in response to the instruction (step S80). Further, the VMM 301 finds out an entry "ID: OS 101, VM Physical Address: xxx, Real Physical Address: ADD1" of the guest OS 101 from the mapping table 702 (step S91).

Figure 19:
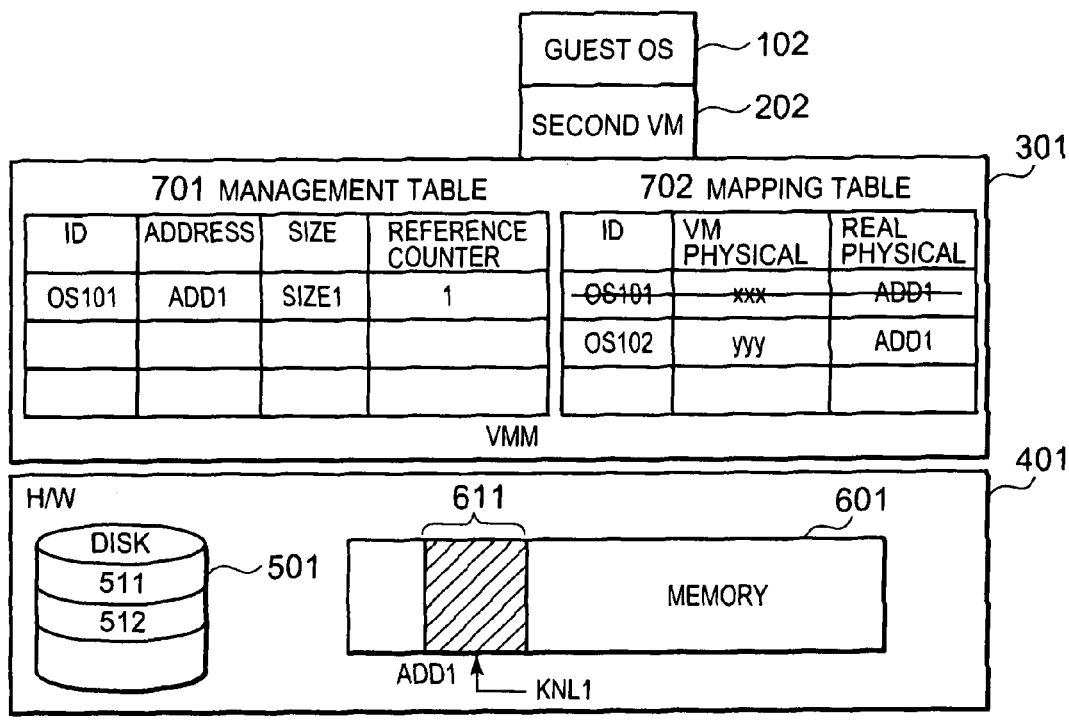

Then, the VMM 301 searches the real physical address "ADD1" on the management table 701 (step S92). As a result, the entry "ID: OS 101, Address: ADD1, Size: SIZE1, Reference Counter: 2" is found out. Thus, the VMM 301 decrements the reference counter CNT of the entry (step S93). As a result, as shown in FIG. 19, the reference counter CNT is changed from "2" to "1" (No in step S94). This means that one guest OS (102) still refers to the kernel image KNL1. Accordingly, the guest OS 101 is stopped, but the memory area 611 is not freed up. The VMM 301 deletes the entry "ID: OS 101, VM Physical Address: xxx, Real Physical Address: ADD1" from the mapping table 702 (step S97).

Now, the case in which the startup of the guest OS 101 is requested again in the state shown in FIG. 19 is described. The guest OS startup parameter 801 input indicates "ID: OS 101, Disk Area: 511, Kernel File Path: Predetermined Path". The VMM 301 refers to the management table 701 (step S20). This time, the entry "ID: OS 101, Address: ADD1, Size: SIZE1, Reference Counter: 1" of the guest OS 101 already exists (No in step S30). That is, the kernel image KNL1 of the guest OS 101 already exists on the physical memory 601. Thus, the process proceeds to step S40.

Figure 20:
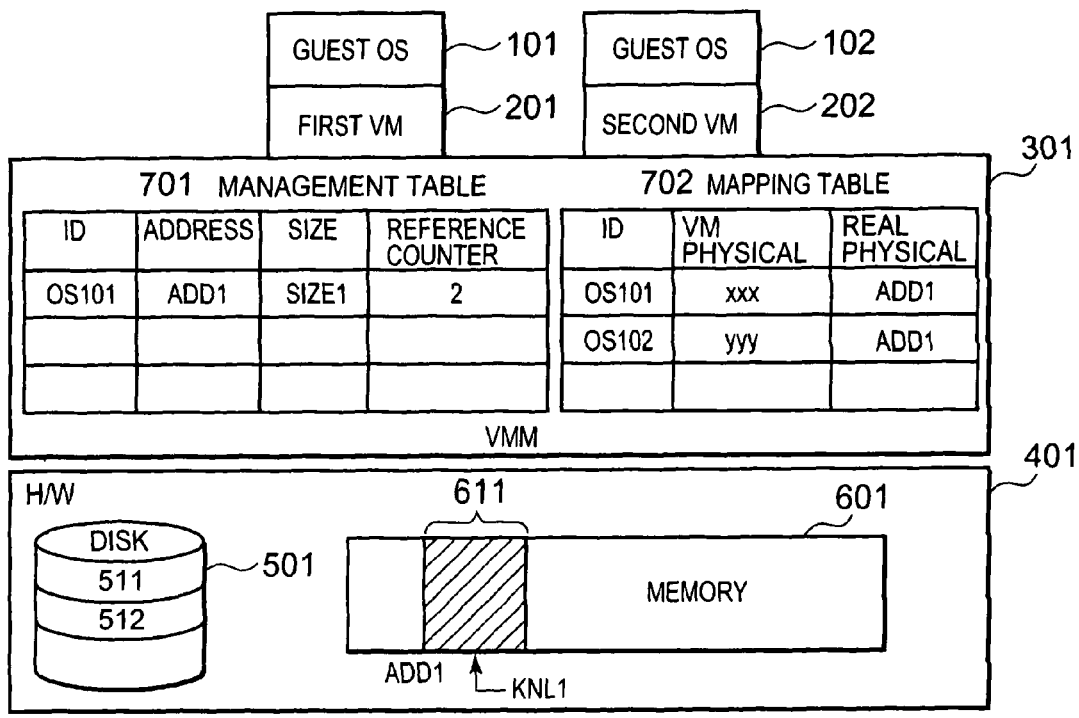

The VMM 301 obtains the real physical address "ADD1" and the size "SIZE1" by referring to this entry (step S41). Then, the VMM 301 defines the memory area in the VM physical address space based on the size "SIZE1" (step S42). Then, the VMM 301 adds the entry "ID: OS 101, VM Physical Address: xxx, Real Physical Address: ADD1" to the mapping table 702 as shown in FIG. 20 (step S43). The setting of the mapping ends.

Further, the VMM 301 increments the reference counter CNT of the entry in the management table 701 (step S44). As a result, the reference counter CNT is changed from "1" to "2". This means that the kernel image KNL1 corresponding to the address ADD1 is shared between two guest OSs (101, 102). Thereafter, the process proceeds to step S70, the startup process of the guest OS 101 ends.

In this invention, it is possible to omit the load process of the kernel image KNL in this startup process of the guest OS 101. This means the shortening of a startup process time of the guest OS. The reason why the load process is omitted is that the kernel image KNL1 has already loaded on the physical memory 601 upon the startup of the guest OS 101 and that the VMM can know that fact by referring to the management table 701 upon the startup of the guest OS. In other word, the time for the startup of the guest OS can be shorten because of the management table 701 indicating of the state of the present kernel image on the physical memory 601.

While this invention has been described in conjunction with the preferred exemplary embodiments described above, it will now be possible for those skilled in the art to put this invention into practice in various other manners.

What is claimed is:

1. A virtual machine system, comprising:
   a physical memory; and
   a virtual machine monitor (VMM), when a kernel image of one guest operating system (OS), in startup of said one guest OS, has already been loaded on said physical memory, said VMM starts up one guest OS with said kernel image,
   said VMM includes a management table representing a state of a kernel image loaded into said physical memory, and said VMM checks whether or not said kernel image of said one guest OS has been loaded on said physical memory based on management table,
   when said kernel image of said one guest OS, in startup of said one guest OS, is not loaded on said physical memory, said VMM loads said kernel image of said one guest OS on said physical memory,
   wherein said VMM adds a new entry of said kernel image of said one guest OS on said management table, when said kernel image of said one guest OS is loaded on said physical memory,
   wherein said VMM checks whether or not said kernel image of said new entry is the same as said kernel image of other entry based on said management table, when there is said other entry except for said new entry, and said management table includes an entry representing a size of said kernel image loaded, said VMM checks by comparing the size of the kernel image of each entry.

2. The virtual machine system according to claim 1, wherein said management table includes an entry representing an address of said kernel image loaded, said VMM checks by reading out said kernel image of each entry based on said management table and comparing said kernel image read out.

3. A virtual machine system, comprising:

a physical memory; and a virtual machine monitor (VMM), when a kernel image of one guest operating system (OS), in startup of said one guest OS, has already been loaded on said physical memory, said VMM starts up one guest OS with said kernel image, said VMM includes a management table representing a state of a kernel image loaded into said physical memory, and said VMM checks whether or not said kernel image of said one guest OS has been loaded on said physical memory based on said management table, when said kernel image of said one guest OS, in startup of said one guest OS, is not loaded on said physical memory, said VMM loads said kernel image of said one guest OS on said physical memory, wherein said VMM adds a new entry of said kernel image of said one guest OS on said management table, when said kernel image of said one guest OS is loaded on said physical memory, wherein said VMM checks whether or not said kernel image of said new entry is the same as said kernel image of other entry based on said management table, when there is said other entry except for said new entry, when said other entry whose kernel image is the same as said kernel image of said new entry exists, said VMM changes mapping of the address regarding said kernel image of said one entry into mapping of the address regarding said kernel image of said other entry, and wherein said VMM further deletes said new entry from said management table and frees up an area where said kernel image of said one guest OS is loaded when said VMM changes mapping of the address regarding said kernel image of said one entry into mapping of the address regarding said kernel image of said other entry.

4. The virtual machine system according to claim 3, wherein said VMM deletes said other entry from said management table and frees up said area where said kernel image of said other guest OS is loaded, when there is no other than guest OS using said kernel image of said other guest OS in shut-down of said other guest OS.

5. The virtual machine system according to claim 4, wherein said entry of said management table includes the number of a guest OS using a kernel image loaded on said physical memory, said VMM changes the number of said new entry and said other entry when said VMM changes mapping of the address regarding said kernel image of said one entry into mapping of the address regarding said kernel image of said other entry.

6. An operating method of a virtual machine system, wherein said virtual machine system includes a virtual machine monitor (VMM), said method comprising:

when a kernel image of one guest operating system (OS), in startup of said one guest OS, has already been loaded on a physical memory, starting up one guest OS with said kernel image;

checking whether or not said kernel image of said one guest OS has been loaded on said physical memory based on a management table in the VMM representing a state of said kernel image loaded on said physical memory;

loading said kernel image of said one guest OS on said physical memory when said kernel image of said one guest OS is not loaded on said physical memory in startup of said one guest OS;

adding a new entry of said kernel image of said one guest OS on said management table when said kernel image of said new guest OS is loaded on said physical memory;

checking, when there is other entry except for said new entry, whether or not said kernel image of said new entry is the same as said kernel image of said other entry based on said management table; and checking whether or not said kernel image of said new entry is the same as said kernel image of said other entry by comparing the size of the kernel image of each entry in said management table representing the size of said kernel image loaded.

7. The operating method of the virtual machine system according to claim 6, wherein said management table includes an entry representing an address of said kernel image loaded, and said checking is done by comparing said kernel image of said one guest OS with said kernel images read out based on said entry of said management table.

8. The operating method of the virtual machine system according to claim 7, said method further comprising:

deleting said new entry from said management table and freeing up said area where said kernel image of said new guest OS is loaded.

9. The operating method of the virtual machine system according to claim 8, said method further comprising:

deleting said other entry from said management table and freeing up said area where said kernel image of said other guest OS is loaded when there is no other than guest OS using said kernel image of said other guest OS in shut-down of said other guest OS.

10. The operating method of the virtual machine system according to claim 9, wherein said entry of said management table includes the number of a guest OS using a kernel image loaded, and further comprising:

changing the number of said other entry and said new entry when changing mapping of the address regarding said kernel image of said one entry into mapping of the address regarding said kernel image of said other entry.

* * * * *